United States Patent
Dusold

(10) Patent No.: US 12,103,599 B1
(45) Date of Patent: Oct. 1, 2024

(54) TRUCK BED STORAGE BOX

(71) Applicant: Andrew W. Dusold, Shoreview, MN (US)

(72) Inventor: Andrew W. Dusold, Shoreview, MN (US)

( * ) Notice: Subject to any disclaimer, the term of this patent is extended or adjusted under 35 U.S.C. 154(b) by 0 days.

(21) Appl. No.: 17/868,293

(22) Filed: Jul. 19, 2022

Related U.S. Application Data

(62) Division of application No. 16/693,770, filed on Nov. 25, 2019, now Pat. No. 11,427,263.

(51) Int. Cl.
  *B62B 3/00* (2006.01)
  *B62B 3/02* (2006.01)
  *B62D 33/02* (2006.01)

(52) U.S. Cl.
  CPC .......... *B62D 33/0207* (2013.01); *B62B 3/002* (2013.01); *B62B 3/022* (2013.01)

(58) Field of Classification Search
  CPC ...... B62D 33/0207; B62B 3/002; B62B 3/022
  See application file for complete search history.

(56) References Cited

U.S. PATENT DOCUMENTS

| | | | | |
|---|---|---|---|---|
| 4,733,898 A | * | 3/1988 | Williams | B62D 33/02 296/24.32 |
| 5,080,250 A | * | 1/1992 | Dickinson | B60R 9/00 220/675 |
| 5,931,632 A | * | 8/1999 | Dongilli | B60R 9/00 224/404 |
| 9,126,610 B1 | * | 9/2015 | Abiri | B62B 3/027 |
| 10,131,373 B1 | * | 11/2018 | Ness | B62B 3/1404 |
| 2001/0052680 A1 | * | 12/2001 | Bennington | B60P 3/0257 280/30 |

* cited by examiner

*Primary Examiner* — Bryan A Evans
(74) *Attorney, Agent, or Firm* — Johnson and Phung

(57) ABSTRACT

A pick-up truck bed storage box having a rectangular container with a length of a pick-up truck bed with the container including an open top, a bottom surface, a pair of side walls, a first and second end wall, at least one collapsible and telescoping leg having a first end connected to the bottom surface of the container proximal the first end wall and at least one collapsible and telescoping leg having the first end connected to the bottom surface of the container proximal the second end wall with each of the legs moveable between a container supporting condition and a stowed away condition, at least one wheel connected to the second end of each of the legs, and a pair of wheel wells located between the side walls and extending upwards into an interior of the container supporting the wheels therein in the stowed away condition.

16 Claims, 3 Drawing Sheets

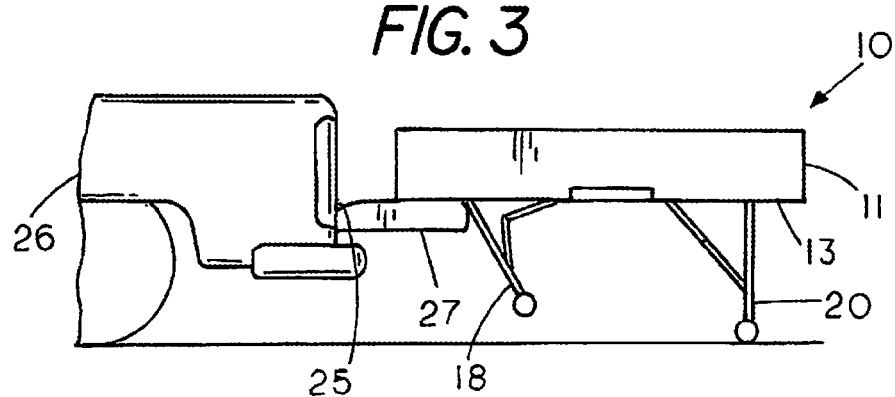
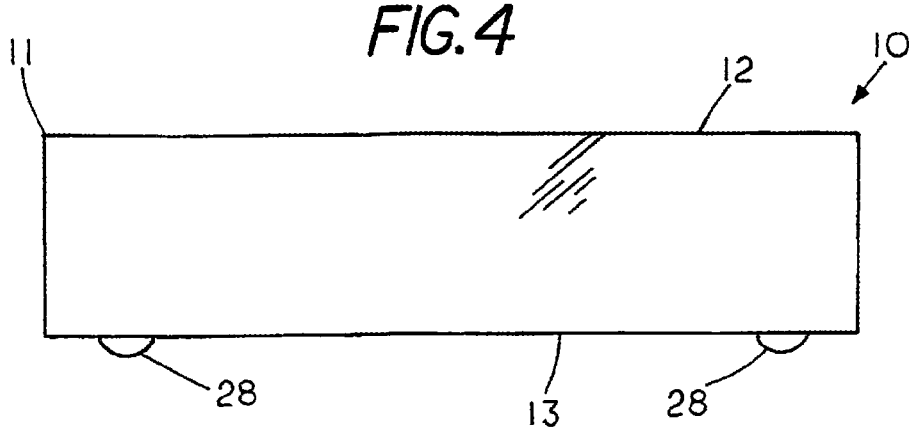
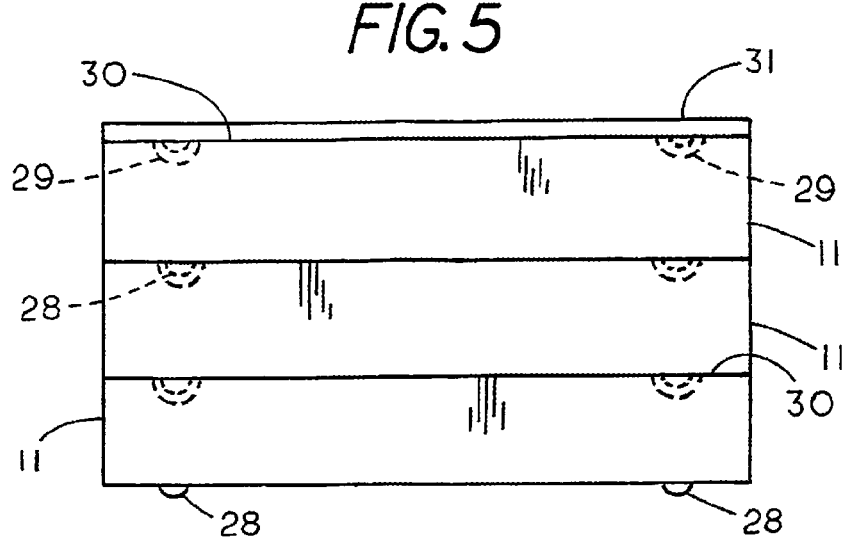

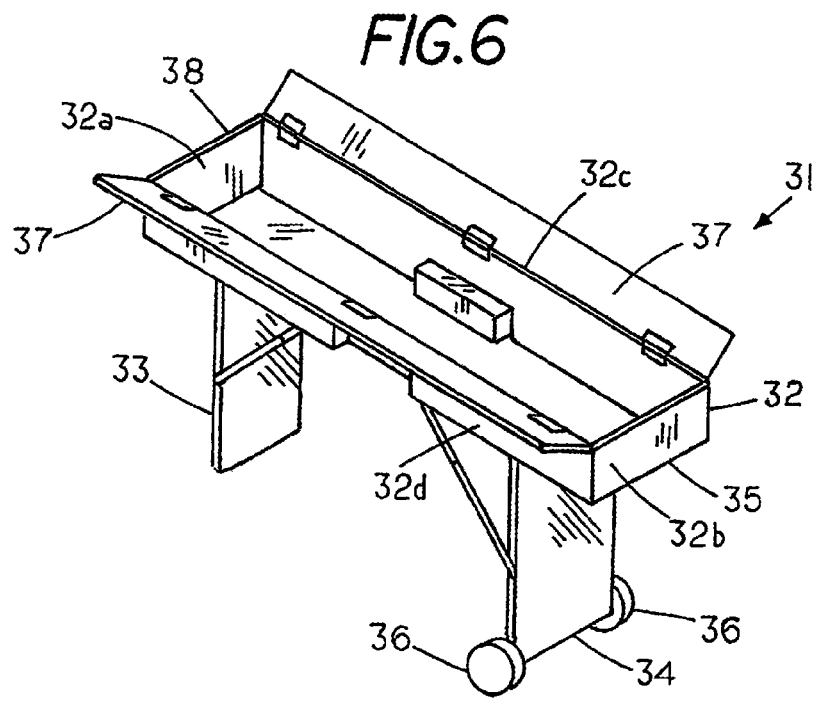
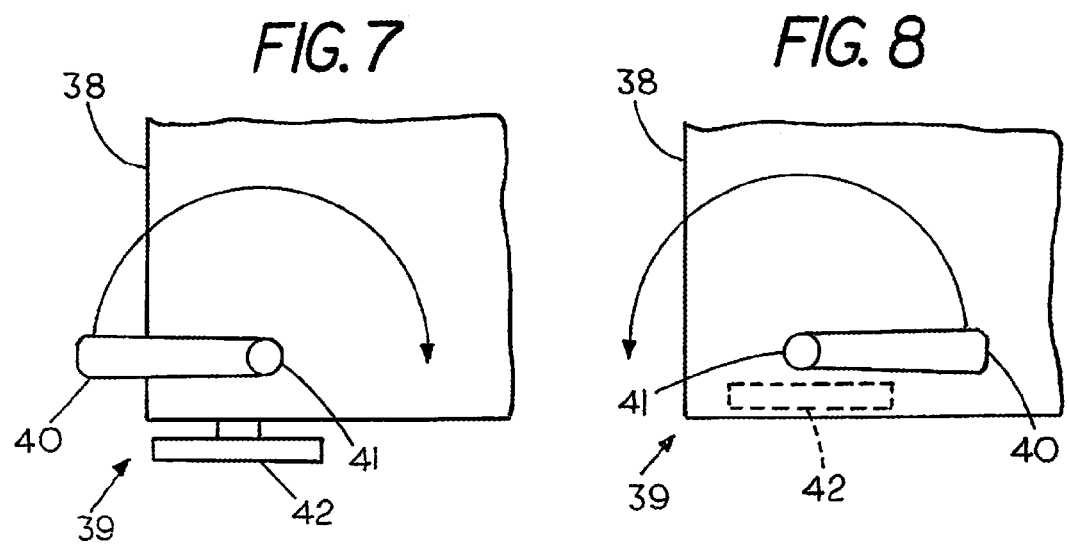

TRUCK BED STORAGE BOX

CROSS REFERENCE TO RELATED APPLICATIONS

This application is a divisional application of currently pending U.S. patent application Ser. No. 16/693,770; filed on Nov. 25, 2019; titled TRUCK BED STORAGE BOX.

FIELD OF THE INVENTION

This invention relates generally to pick-up truck beds and, more specifically to a multi-purpose storage container for the beds of pick-up trucks.

CROSS REFERENCE TO RELATED APPLICATIONS

None

STATEMENT REGARDING FEDERALLY SPONSORED RESEARCH OR DEVELOPMENT

None

REFERENCE TO A MICROFICHE APPENDIX

None

BACKGROUND OF THE INVENTION

Storage containers for pick-up truck beds are known in the art and generally include permanently fixed structures that are directly secured to a portion of the pick-up truck bed. As an option to fixed storage containers, pickup truck owners have been known to also use wheel-less storage totes or plastic containers for supporting cargos on their pick-up truck bed. Some of the problems associated with the use of the aforementioned storage totes or plastic containers on the pick-up truck bed are that the storage totes or plastic containers and the cargo that they support often shift around during transport, the storage totes or plastic containers may be time consuming and heavy to load in and out of the trucks bed. There thus is a need for a storage container specifically designed for the beds of pick-up trucks that will solve the aforementioned issues.

SUMMARY OF THE INVENTION

Briefly, the present invention comprises a pick-up truck bed storage box that includes a one-piece rigid weatherproof non-metallic rectangular container having a length similar to the length of traditional a pick-up truck bed. The rigid rectangular container includes an open top, a bottom surface, a pair of parallel side walls, a first end wall and a second end wall. The rigid rectangular container also includes a first pair of collapsible and telescoping legs each having a first end and a second end with the first end connected to the bottom surface of the container proximal the first end wall of the container and a second pair of collapsible and telescoping legs each having a first end and a second end with the first end connected to the bottom surface of the container proximal the second end wall of the container.

Each of the legs are moveable between a container supporting condition and a stowed away condition with the legs being flushed with the bottom surface of the container in the stowed away condition and include a rotatable wheel connected to the second end of each of the legs.

The rigid rectangular container further includes a pair of wheel wells located between the parallel side walls and extending upwards into an interior of the container for supporting the wheels therein when the collapsible and telescoping legs are in the stowed away condition. The rigid rectangular container may also include at least one pair of corresponding divider support slot located on the side walls within the interior of the container.

BRIEF DESCRIPTION OF THE DRAWINGS

FIG. 3 is a side view showing the loading of the pick-up truck bed storage box of FIG. 1 onto a bed of a pick-up truck;

FIG. 4 is a side view showing the loading of the pick-up truck bed storage box of FIG. 1 with the legs in the stowed away condition;

FIG. 5 is a side view showing a plurality of pick-up truck bed storage box stacked on top of each other for storage purposes;

FIG. 6 is a perspective view showing an alternative embodiment of a pick-up truck bed storage box;

FIG. 7 is a partial side view showing a container having a level and cam-based brake in a brake condition; and FIG. 8 is a partial side view showing the level and cam-based brake of FIG. 7 in an out of the way condition.

DESCRIPTION OF THE PREFERRED EMBODIMENT

Figure 1:
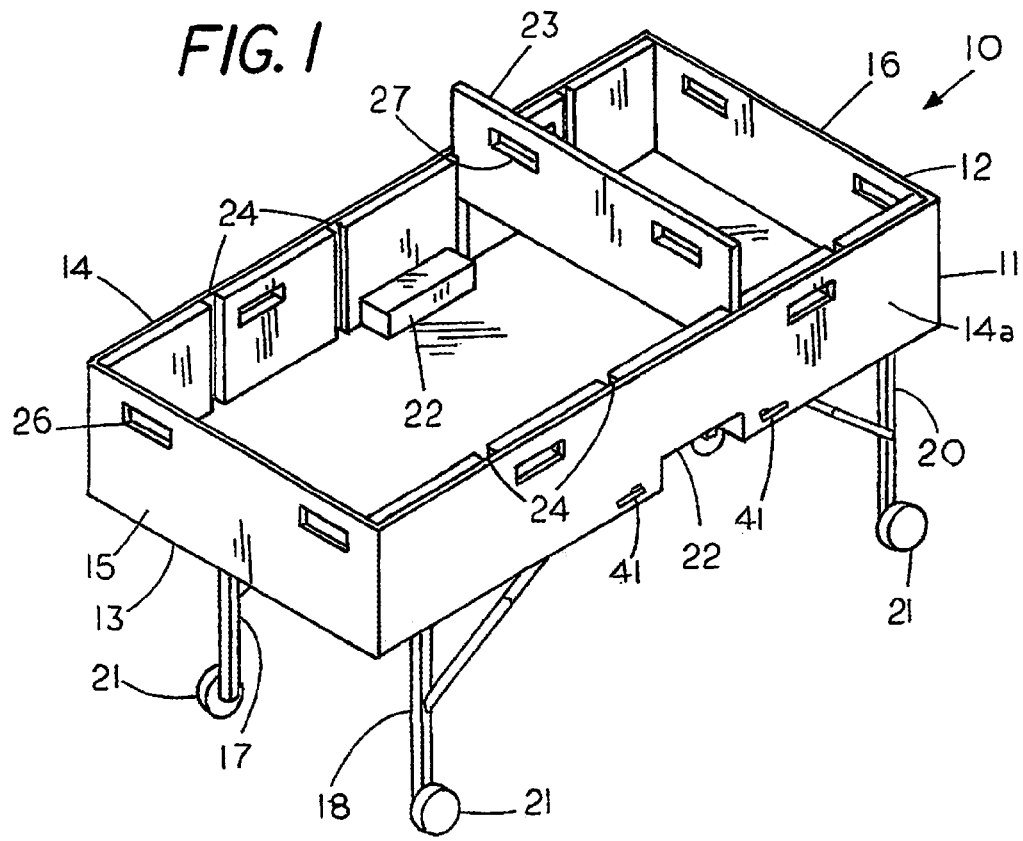
FIG. 1 is a perspective view showing an embodiment of a pick-up truck bed storage box.

The general purpose of the present invention, which will be described subsequently in greater detail, is to provide a portable multi-purpose storage container that is sized and shaped to conform to the size and shape of the beds of traditional pick-up trucks. The multi-purpose storage container of the present invention allows for the quick and ease of loading and unloading of articles such as tools, supplies, and cargo support therein between a work or residential site and the interior of the bed of the pick-up truck for transport by actually loading and unloading at least half if not all of the articles supported on the pick-up truck in a one shot manner.

That is, the portable multi-purpose storage container of the present invention conforms to the dimension of the beds of traditional pick-up trucks in a manner such that the user can use the portable multi-purpose storage container as an interchangeable bed for their pick-up trucks. For example, since many pick-up truck users use their pick-up trucks for both business and personal purposes, a construction person may use a first portable multi-purpose storage container to store tools and related equipment during the workday and then unload the first portable multi-purpose storage container from the bed of their pick-up truck in a one shot manner with an empty second portable multi-purpose storage container to run personal errands such as picking up groceries. One of the advantages of the present invention is that tools and related equipment supported within first portable multi-purpose storage container never has to be removed therefrom thereby eliminating the probability of their misplacement. Before the construction person heads off to work the next day, he or she may then replace the second portable multi-purpose storage container from the bed of their pick-up truck with the first portable multi-purpose storage container along with all of their work equipment supported therein, again, in a one-shot manner.

There has thus been outlined the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the disclosing subject matter be regarded as including such equivalent constructions insofar as they do not depart from the spirit and scope of the present invention.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

In addition, the accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of any potential claims.

Figure 2:
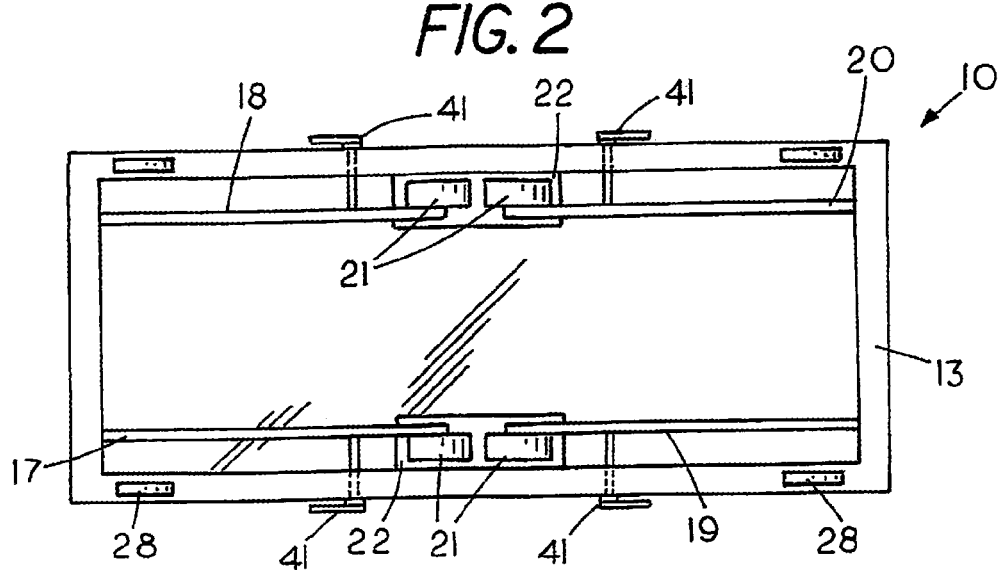
FIG. 2 is a bottom view showing the pick-up truck bed storage box of FIG. 1.

Referring to FIGS. 1 and 2, FIG. 1 is a perspective view and FIG. 2 is a bottom view showing an embodiment of a pick-up truck bed storage box 10 of the present invention which includes a container for supporting and housing articles such as tools, supplies, and various other types of cargos therein. Although the container of the present invention may comprise a variety of shapes and sizes and be made from a plurality of materials including but not limited to metal, wood, and plastic, the container shown in FIG. 1 comprises a rectangular shaped container 11 made from a one-piece rigid weather-proof non-metallic material, such as through a plastic molding or extrusion process, having a length similar to that of a standard pick-up truck bed, which typically comprises the lengths 5 feet, 6 feet, and 8 feet. Tan interior surface of container 11 may include a non-slip rubber foam coating to assist in preventing unnecessary movements of cargos supported therein during transport.

In regards to the width of container 11, the width of container 11 may comprise but is not limited to a width of one-half a width of a typical pick-up truck bed and a width similar to that of a typical pick-up truck bed, which normally comprises 4 feet.

Rigid rectangular container 11 includes an open top 12, a bottom surface 13, a pair of parallel side walls 14 and 14a, a first end wall 15 and a second end wall 16. Rigid rectangular container 11 also includes a first pair of collapsible and telescoping legs 17, 18 each having a first end 17a, 18a and a second end 17b, 18b with the first ends 17a and 18a connected to the bottom surface 13 of the container 11 proximal the first end wall 14 of the container 11.

Rigid rectangular container 11 also includes a second pair of collapsible and telescoping legs 19, 20 each having a first end 19a, 20a and a second end 29b, 20b with the first end 19a, 20a of the second pair of collapsible and telescoping legs 19, 20 connected to the bottom surface 13 of the container 11 proximal the second end wall 14a of the container 11. It is noted that legs 17, 18, 19, and 20 preferably operated independently from each other.

The telescoping features of legs 17, 18, 19, and 20 allows the user to adjust the height of pick-up truck bed storage box 10 to fit a variety height, depending on the user's needs.

A feature of the embodiment of FIG. 1 is that each of the legs 17, 18, 19 and 20 are moveable between a container supporting condition, which is shown in FIG. 1, and a stowed away condition, which is shown in FIG. 2, with the legs 17, 18, 19 and 20 being flushed with the bottom surface 13 of the container 11 in the stowed away condition.

Another feature of the legs 17, 18, 19 and 20 for the embodiment of FIG. 1 is that at least one pair of the collapsible and telescoping legs 17, 18, 19 and 20 are removable from the container 11, and preferably without an aid of a tool, to assist in the transfer of the container 11 onto the truck bed. That is, once one of the sets of legs 17, 18, 19 and 20 collapse and move to the stowed away condition and is locked therein in a snap in manner by a leg locking catch 41 that corresponds to each of the legs. It is noted that leg locking catch 41 functions to temporarily maintain the corresponding leg 17, 18, 19 and in the stowed away condition until the leg 17, 18, 19 and 20 is released by the user to be dropped down. A portion of container 11 is transferred onto the bed of the pick-up truck such that container 11 is self-supported on the bed of the pick-up truck, the second set of legs 17, 18, 19 and 20 may then be removed from the bottom surface 13 of the container 11 as an alternative to collapsing to the stowed away condition in the event that the second set of legs 17, 18, 19 and 20 are prevented from collapsing due to a blockage.

In the embodiment of FIGS. 1 and 2, attached to the second ends 17b, 18b, 19b and 20b of each of the collapsible and telescoping legs 17, 18, 19 and 20 is a rotatable wheel 21 to provide pick-up truck bed storage box 10 with greater ease in transport. Rotatable wheel 21 may either comprise a bi-lateral rotating wheel or the preferred coaster-type wheels, or some combination of the two. Each of the wheels may include an independent lock mechanism to prevent their rotation.

Rigid rectangular container 11 also includes a pair of wheel wells 22 located between the parallel side walls 14, 14a and extending upwards from the bottom surface 13 into an interior of the container 11 for supporting the wheels 21 therein when the collapsible and telescoping legs 17, 18, 19 and 20 are in the stowed away condition as shown in FIG. 2.

In further regards to the stowed away condition, although the legs 17, 18, 19 and 20 of rigid rectangular container 11 are flushed with the bottom surface 13 of the container 11 in the stowed away condition, some embodiments of the present invention may comprise the wheels 21 being flushed with the bottom surface 13 of the container 11 in the stowed away condition whereas alternative embodiments may comprise the wheels 21 not being flushed with the bottom surface 13 of the container 11 in the stowed away condition. In the embodiments in which the wheels 21 are not flushed with the bottom surface 13 in the stowed away condition, the wheels 21 may be locked to provide frictional resistance to assist in preventing the movement of container 11 when supported on the pick-up truck bed.

The container 11 of the present invention may also include the optional feature of at least one pair of corresponding divider support slot located on the side walls within the interior of the container. Referring to the embodiment of FIG. 1, rigid rectangular container 11 is shown including four sets of divider support slots 24 each function to support an end of a removable container divider 23 therein. Although not shown, an interior bottom surface of container 11 may also include indentations or additional divider support slots extending there from, which corresponds to each of the sets of divider support slots 24 in order to support a side of removable container divider 23 to add further support to removable container divider 23 when supported within container 11.

The container 11 of the present invention may also include integrated recessed handles 26 located around the container assisting in the transporting process. In addition, the removable container divider 23 are also shown including integrated recessed handles 27 for assisting in their installation and removal from the divider support slots 24.

FIG. 3 is a side view showing the loading of the pick-up truck bed storage box 10 onto a bed 25 of a pick-up truck 26. In the loading process of pick-up truck bed storage box 10 onto bed 25, the pick-up truck bed storage box 10 is aligned with the bed 25 such that the bottom surface 13 of the pick-up truck bed storage box 10 is positioned slightly vertically above a support surface 27 of a tailgate 27 of the truck 26. The is accomplished by the telescoping features of legs 17, 18, 19, and 20, which allow the user to adjust the height of pick-up truck bed storage box 10 with respect to the height of tailgate 27 or the height of the bed 25 of the truck 26 for trucks that do not have a tailgate. One of the ends of the pick-up truck bed storage box 10 is then pushed over the tailgate 27, which eventually results in one of the sets of legs 17, 18, 19 and 20 collapsing to the stowed away condition.

The pick-up truck bed storage box 10 is then pushed into the bed 25 of the pick-up truck 26 until pick-up truck bed storage box 10 is self-supported on bed 25 after which the second set of legs 17, 18, 19 and 20 is then either collapsed to the stowed away condition or alternatively removed from the bottom surface 13 of pick-up truck bed storage box 10.

FIG. 4 is a side view showing the loading of the pick-up truck bed storage box 10 with the legs 17, 18, 19 and 20 in the stowed away condition. As shown in FIG. 4 and also shown in FIG. 2, the pick-up truck bed storage box 10 includes a plurality of lockable rollers 28 extending from the bottom surface 13 of container 11 with the lockable rollers 28 facilitating the movement of container 11 on pick-up truck bed 25 while preventing the movement of container 11 on pick-up truck bed 25 when the rollers 28 are in a locked condition.

FIG. 5 is a side view showing a plurality of pick-up truck bed storage box 10 stacked on top of each other for storage purposes. More specifically, each of the pick-up truck bed storage box 10 includes a plurality roller receiving slots 29 located on a rim 30 of container 11 with the locations of the roller receiving slots 29 corresponding to the locations of the lockable rollers 28 to enable their mating engagement for container storage purposes. FIG. 5 also shows the use of an optional removable lid that is secured to the rim of the container 11 to maintain and protect the cargo that is supported within container 11.

FIG. 6 is a perspective view showing an alternative embodiment of a pick-up truck bed storage box 31 of the present invention. Pick-up truck bed storage box 31 generally comprises similar components to the pick-up truck bed storage box 10 of FIGS. 1 and 2.

However, unlike pick-up truck bed storage box 10, pick-up truck bed storage box 31 includes a container 32 having a width one-half the width of the pick-up truck bed 26.

In addition, instead of having a first pair and a second pair of legs, pick-up truck bed storage box 31 includes a first collapsible and telescoping leg 33 each a first end 33a and a second end 33b with the first end 33a connected to a bottom surface 35 of the container 32 proximal a first end wall 32a of the container 32.

Rigid rectangular container 31 also includes a second collapsible and telescoping leg 34 having a first end 34a and a second end 34b with the first end 34a of the second collapsible and telescoping leg 34b connected to the bottom surface 35 of the container 32 proximal a second end wall 32b of the container 32. Similar to legs 17, 18, 19 and 20, a feature of the embodiment of FIG. 6 is that each of the legs 33 and 34 are moveable between a container supporting condition and a stowed away. However, in the embodiment of FIG. 6, only the second leg 35 is shown to include a set of wheels 36 attached to the second end of leg 34 for supporting container 32 on a support surface while the second end 33a of leg 33 directly engages the support surface to support container 32 thereon. Pick-up truck bed storage box 31 also is shown to include pivotally attached lids 37 connected to an open top 38 of container 32 by way of a pair of parallel side walls 33c, 32d to maintain and protect the cargo that is supported within container 32.

FIGS. 7 and 8 are partial side views each showing an optional feature of the present invention comprising at least a pair of brakes 39 located on a container 38 to assist in preventing container 38 from sliding about on the truck bed 25 during the transporting of container 38. The brakes 39 are shown generally utilizing a lever 40 attached to a cam 41 that is operable to move a friction pad 42 between an out of the way condition as shown in FIG. 8 and a brake condition identified by the lowering down of friction pad 42 to truck bed 25 followed by the raising of container 38 from truck bed 25 as shown in FIG. 7 to reduce or prevent container 38 from sliding on truck bed 25.

I claim:

1. A pick-up truck bed storage box comprising:
a one-piece rigid weather-proof non-metallic rectangular container having a length of a pick-up truck bed, said rigid rectangular container including an open top, a bottom surface, a pair of parallel side walls, a first end wall and a second end wall;
a first pair of collapsible and telescoping legs each having a first end and a second end with said first end connected to said bottom surface of said container proximal said first end wall of said container and a second pair of collapsible and telescoping legs each having a first end and a second end with said first end connected to said bottom surface of said container proximal said second end wall of said container, each of said legs moveable between a container supporting condition and a stowed away condition with said legs being flushed with said bottom surface of said container in said stowed away condition;
a rotatable wheel connected to said second end of each of said collapsible and telescoping legs;
a pair of wheel wells located between said parallel side walls and extending upwards into an interior of said container for supporting said wheels therein when said collapsible and telescoping legs are in said stowed away condition;
at least one pair of corresponding divider support slot located on said side walls within said interior of said container; and
a plurality of lockable rollers extending from said bottom surface of said container with said lockable rollers facilitating the movement of said container on said pick-up truck bed and preventing the movement of said container on said pick-up truck bed when said rollers are in a locked condition and a plurality roller receiving slots located on a rim of said container with said locations of said roller receiving slots corresponding to the locations of said lockable rollers to enable their mating engagement for container storage purposes.

2. The pick-up truck bed storage box of claim 1 wherein said rigid rectangular container having a width one-half a width of a pick-up truck bed.

3. The pick-up truck bed storage box of claim 1 wherein said rigid rectangular container having a width a pick-up truck bed.

4. The pick-up truck bed storage box of claim 3 wherein said container include a leg locking catch for each leg for temporarily maintaining said legs in said stowed away condition.

5. The pick-up truck bed storage box of claim 4 wherein at least one pair of said collapsible and telescoping legs are removable from said container.

6. The pick-up truck bed storage box of claim 1 wherein said container includes at least a pair of brakes with each of said brakes utilizing a lever attached to a cam that is operable to move a friction pad between an out of the way condition and a brake condition identified by the lowering down of said friction pad to said truck bed followed by the raising of said container from said truck bed to reduce said container from sliding on said truck bed.

7. The pick-up truck bed storage box of claim 6 wherein said side walls and end wall of said container includes integrated recessed handles.

8. The pick-up truck bed storage box of claim 7 including an attached lid connected to said open top of said container.

9. A pick-up truck bed storage box comprising:
a one-piece molded rigid rectangular container having a length of a pick-up truck bed, said rigid rectangular container including an open top, a bottom surface, a pair of parallel side walls, a first end wall and a second end wall;
at least one collapsible and telescoping leg having a first end and a second end with said first end connected to said bottom surface of said container proximal said first end wall of said container and at least one collapsible and telescoping leg having a first end and a second end with said first end connected to said bottom surface of said container proximal said second end wall of said container, each of said legs moveable between a container supporting condition and a stowed away condition;
at least one rotatable wheel connected to said second end of each of said collapsible and telescoping legs;
a pair of wheel wells located between said parallel side walls and extending upwards into an interior of said container for supporting said wheels therein when said collapsible and telescoping legs are in said stowed away condition; and
a plurality of lockable rollers extending from said bottom surface of said container with said lockable rollers facilitating the movement of said container on said pick-up truck bed and preventing the movement of said container on said pick-up truck bed when said rollers are in a locked condition and a plurality roller receiving slots located on a rim of said container with said locations of said roller receiving slots corresponding to the locations of said lockable rollers to enable their mating engagement for container storage purposes.

10. The pick-up truck bed storage box of claim 9 including at least one pair of corresponding divider support slot located on said side walls within said interior of said container.

11. The pick-up truck bed storage box of claim 9 wherein said rigid rectangular container having a width one-half a width of a pick-up truck bed.

12. The pick-up truck bed storage box of claim 9 wherein said rigid rectangular container having a width a pick-up truck bed.

13. The pick-up truck bed storage box of claim 9 wherein said at least one rotatable wheel comprises a pair of rotatable wheels connected to said second end of each of said collapsible and telescoping legs.

14. The pick-up truck bed storage box of claim 9 including an attached lid connected to said open top of said container.

15. The pick-up truck bed storage box of claim 9 wherein at least one of said collapsible and telescoping legs are removable from said container.

16. The pick-up truck bed storage box of claim 9 wherein said container include a leg locking catch for each leg for temporarily maintaining said legs in said stowed away condition.

* * * * *